United States Patent [19]

Le Comte

[11] Patent Number: 4,529,172
[45] Date of Patent: Jul. 16, 1985

[54] METHOD AND MEANS FOR INSTALLING A CABLE WITHIN A CONDUIT
[75] Inventor: Michel Le Comte, Bures sur Yvette, France
[73] Assignee: Jeumont-Schneider Corporation, Cedex, France
[21] Appl. No.: 481,845
[22] Filed: Apr. 4, 1983
[30] Foreign Application Priority Data
  Apr. 8, 1982 [FR] France .................. 82 06121
[51] Int. Cl.³ .................................... H02G 1/08
[52] U.S. Cl. ................. 254/134.3 FT; 269/8; 269/207; 269/329
[58] Field of Search .......... 254/134.3 FT, 134.3 R; 428/616-619; 269/8, 207, 209, 70, 329

[56] References Cited
U.S. PATENT DOCUMENTS

| | | | |
|---|---|---|---|
| 1,763,634 | 6/1930 | Agobian | 269/209 X |
| 2,575,213 | 11/1951 | Fruth | 428/616 X |
| 3,963,229 | 6/1976 | van Duynhoven | 269/8 |
| 4,337,922 | 7/1982 | Streiff et al. | 254/134.3 FT |

FOREIGN PATENT DOCUMENTS

| | | |
|---|---|---|
| 0017616 | 10/1980 | European Pat. Off. . |
| 617656 | 8/1935 | Fed. Rep. of Germany ... 254/134.3 FT |
| 617657 | 8/1935 | Fed. Rep. of Germany . |
| 1153810 | 9/1963 | Fed. Rep. of Germany ... 254/134.3 R |
| 460896 | 10/1968 | Switzerland . |

Primary Examiner—Frederick R. Schmidt
Assistant Examiner—Steven P. Schad
Attorney, Agent, or Firm—Rines and Rines, Shapiro and Shapiro

[57] ABSTRACT

This method is intended to permit installing of a cable of considerable length within a conduit, by means of a hauling line, under the most favorable possible conditions, so as to eliminate friction between the cable and the inner surface of the conduit, and, specifically, with reduction of tractive force to be applied to the cable. In accordance with the present invention, the aforementioned method consists of attaching the cable to a hauling line, according to its full length, at locations whose positions are to be determined in relation to resistance to tension affecting sections of the cable demarcated in this manner, so that, with the cable possessing some slackness, none of the sections of said cable shall be affected by stress affecting the preceding section, and so that tractive force shall be distributed along successive sections of the cable while it is being installed.

The means for applying the aforementioned method shall consist of mechanical fasteners which shall grip the previously cited hauling line (4), such as a clamp (6) outfitted with two components forming a vise within which the cable (2) which must be drawn forward is to be inserted, with at least one of said components being jointed so as to permit gripping or releasing of the cable according to the desired results.

14 Claims, 8 Drawing Figures

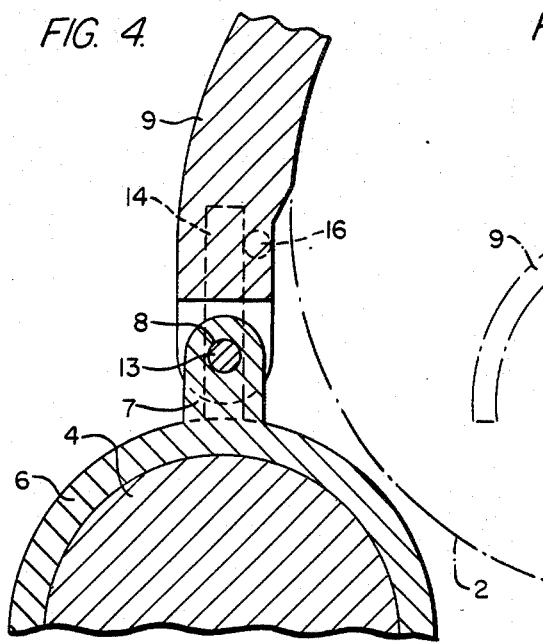
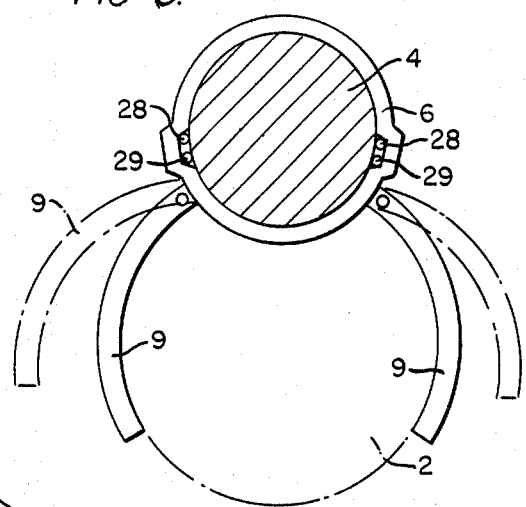
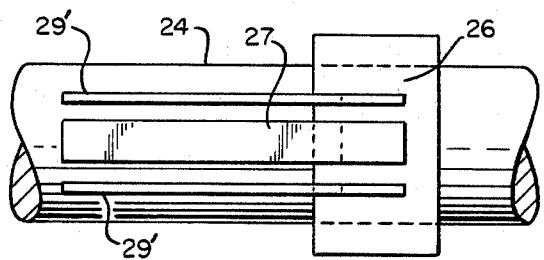
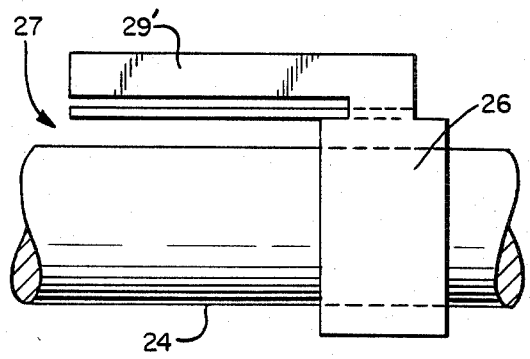
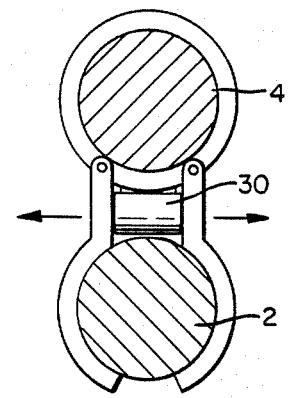

METHOD AND MEANS FOR INSTALLING A CABLE WITHIN A CONDUIT

The present invention pertains to a method and to means whereby a cable of considerable length can be installed within a conduit under the most favorable possible conditions, namely without a need to apply excessive tractive force to the cable and with prevention of friction between the cable and the inner surface of the conduit. In terms of conventional techniques, it is known that procedures of this type can be performed by pulling the unattached end of the cable by means of a hauling line which is to be placed inside the conduit beforehand. Then the cable is unwound from the reel upon which it has previously been wound, in relation to the extent to which it is to be drawn forward within the conduit.

This mode of operation is characterized by the disadvantage that its effectiveness is limited by resistance to tension within the cable, which must overcome resistance produced by increasing friction between the cable and the inner surface of the conduit.

The present invention is intended to provide a method and means whereby it is possible to eliminate this particular disadvantage.

In summary, with the aforementioned method, the full length of the cable is temporarily fastened to the hauling line by mechanical attachments, at locations whose positions are determined in relation to resistance to tension affecting sections of the cable demarcated in this manner, so as to permit installing of the cable by distribution of tractive force among successive sections of the cable, while all tractive force with respect to the hauling line is to be applied to its front end. It is possible to accomplish fastening of the cable to the hauling line by means of mechanical attachments, such as clamps or collets mounted upon the hauling line, with said items being outfitted with two components forming a vise within which it is possible to insert the cable. At least one of the aforementioned components is jointed, in order to permit gripping or manual releasing of the cable as desired, and this particular component can be locked into a closed position by any conventional means.

In accordance with the invention, disengagement or fastening of the components which constitute a vise can also be accomplished by remote control, for example by thermal means.

For this purpose, the previously cited components can consist of bimetal strips which are capable of being heated by means of an electric current flowing through means of conduction situated along the hauling line, for example, whereby it shall be possible to apply heat to one or both of the previously cited bimetal strips so as to cause disengagement of the aforementioned vise, in order to release the cable, or, on the other hand, to grip the cable, depending upon the type of bimetal strip and in accordance with the results which may be desired.

Furthermore, for the purpose of reducing friction between the inner surfaces of the conduit and the assembly consisting of the hauling line and the cable, it is possible, in terms of the direction in which this assembly must be drawn forward, to introduce a fluid injected into the conduit at a high speed, so that turbulence affecting said fluid, as well as its contact with the cable, shall facilitate forward movement of the cable.

Injecting a fluid in this manner also provides the advantage of supplying lubrication, which offers beneficial results in addition to the previously cited results derived from use of this particular method and of attachments permitting use of said method.

The characteristics and advantages of the present invention shall be more fully understood in relation to the description provided hereinafter and in relation to the accompanying illustrations, which correspond to a non-restrictive example of said invention.

BRIEF DESCRIPTION OF THE DRAWINGS

In order to illustrate the method to which the invention pertains, FIG. 1 provides a schematic cut away view of a conduit and a cable inside the conduit, as well as showing a hauling line outfitted with mechanical fasteners for securing the cable to said hauling line at various locations, in order to permit installing of the cable by succesive pulling procedures.

FIG. 4 is a cut away view according to IV—IV within FIG. 3.

FIG. 5 is a schematic representation of a mechanical fastener in open and closed positions.

FIGS. 6 and 7 represent another version of a fastener.

FIG. 8 provides a schematic representation of a magnetic control arrangement fastened to the components to which the present invention pertains.

Items which appear within one or more drawings have been identified by the same reference numbers.

Figure 1:
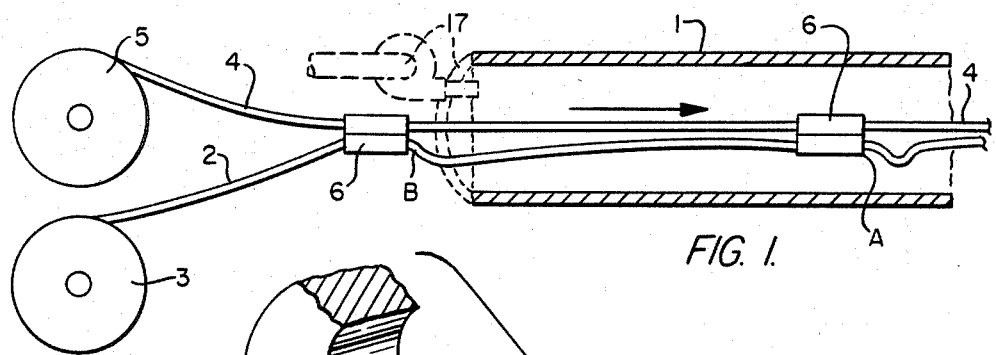

Within FIG. 1, reference number (1) designates the conduit, where a cable (2) is to be installed according to the direction indicated by the arrow, with said cable being pulled by means of a hauling line (4).

It is specified that the aforementioned hauling line must be fed into the conduit (1) beforehand, according to its unattached end, so that it shall extend throughout the conduit. Subsequently, as the cable (2) is unwound from its reel (3) and as the hauling line (4) is unwound from its respective reel (5), above the inlet of the conduit (1), the cable shall be attached to the hauling line (4) by means of couplings (6) placed at locations identified as A, B . . . . Spacing of the couplings is determined in relation to resistance to tension affecting the corresponding section of the cable, and, when the cable is somewhat slack, each section of the cable shall therefore be unaffected by stress affecting the preceding section.

Figure 2:
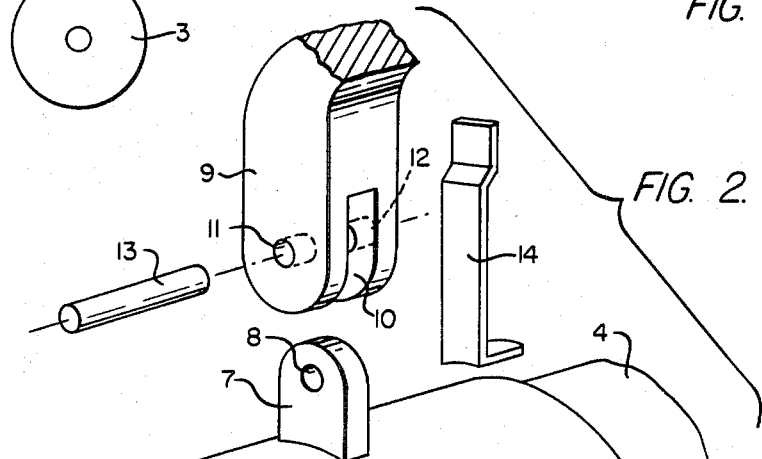
FIG. 2 an enlarged partial perspective of a fastener, such as a clamp in this particular instance, whereby it shall be possible to attach the cable to the hauling line.
Figure 3:
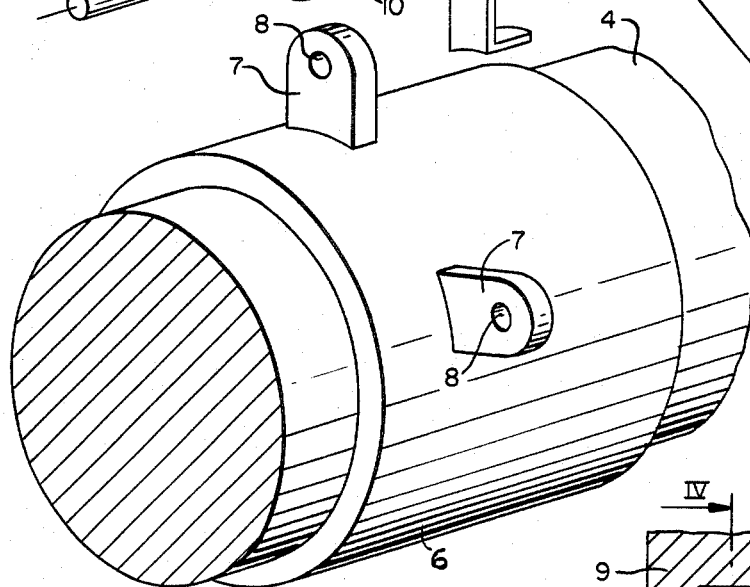
FIG. 3 provides a cut away view of the mechanical fastener which appears within FIG. 2, after it has been assembled.
Figure 3:
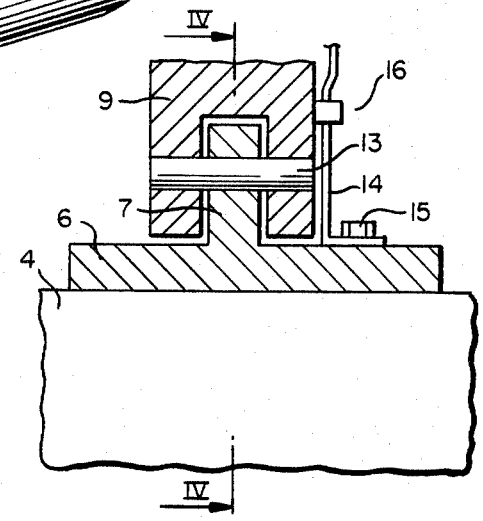

In a simplified schematic form, FIG. 2 provides an enlarged perspective drawing of an example of a device permitting attachment of the cable (2) to a hauling line (4), whereas FIGS. 3 and 4 provide partial cut away views of the device appearing within FIG. 2, subsequent to assembly.

For the example of an application which appears in FIGS. 2 through 4, the fastener for the cable (2) consists of a clamp (6) which is integral with the hauling line (4). This clamp is outfitted with two components which constitute a vise. Each of these components consists of a piece in the form of a lug (7), which is integral with the clamp (6) and contains a hole (8), as well as another piece (9) with a cambered shape. One end of the latter piece is in the form of a stirrup (10), and it contains holes identified as (11) and (12).

Each of the lugs (7) is designed so that it shall fit within a corresponding stirrup (10). A pivot (13) situated parallel to the axis of the hauling line (4) and extending through the holes (11, 8, and 12), connects the pieces identified as (7) and (9), so as to allow the latter piece to turn in the required manner. When the components identified as (7), (9), and (10) are in a closed position, locking is ensured by an element such as a plate (14), which is integral with the clamp (6), and this element engages with another element, such as a stop (16), which is integral with the pivoting component identified as (9).

In turn, any conventional means can be employed to restrict crosswise movement of the pin identified as (13). For this purpose, it is therefore possible to provide a head at one end and a bolt or groove at the other end, in conjunction with a spring-operated finger mounted upon the stirrup (10).

The components identified as (9), which are intended to grip the cable (2) while it is being installed within the conduit, with only one of these components being jointed, possess an essentially cambered shape, as has been indicated heretofore, and the radius of curvature approximates that of the cable itself, so that these components can be adapted to the shape of the cable, in order to provide more secure gripping. The surface which is in contact with the cable can possess grooves extending crosswise in relation to the axis of the cable, in order to provide increased gripping strength.

Whereas FIGS. 2 through 4 provide a partial view of only one of the components identified as (9), both of these components (9) are shown in FIG. 5 in a clamping position upon the cable (2) (complete lines), and in a position permitting releasing of the cable (dashes).

Inasmuch as the same remote control mechanism for opening and closing the vises is used for all of said vises, preferably in order to restrict the number of remote control wires, it is necessary to be able to open and close any vise arriving at the conduit inlet at a given time. In the example shown in the drawings, it is therefore possible to open a given vise manually, by pushing aside the flexible plate (14) which is mounted upon the clamp (6) at the location identified by reference number (15).

The stop (16) which is integral with the corresponding component (9) of the vise is moved downward. As soon as the cable has been properly positioned, it is possible to close the vise and to release the plate (14), so that it can return to its original position.

It is possible to achieve remotely controlled opening of the vise by operation of either or both components identified as (9), with use of any conventional mechanical means to permit shifting of said components.

As examples of appropriate means, it is possible to cite:
Control by magnetic means, whereby force is to be applied to the vise in order to cause pivoting of the vise in an open position.

This type of arrangement permits elimination of the previously cited stop.

Control by magnetic means, applied to a material which quickly loses its magnetic properties above a certain temperature, namely the Curie point. Potential energy stored in a specific location (within a spring, or a permanent magnet which is not affected by changes in temperature, et cetera . . . ) causes the vise to shift to an open position when the magnetic means (30), as shown in FIG. 8, (at the Curie point) no longer provides resistance to the effects of stored potential energy.

Control by thermal means: in this instance, the vise consists of two bimetal strips which are capable of being electrically heated by means of a current flowing through means of conduction situated along the hauling line, which can provide heat for either or both of the bimetal strips. The conductors are identified by reference numbers (28) and (29) within FIG. 5.

In the example appearing within FIGS. 2, 3, and 4, the components which constitute vises are arranged so as to operate within a plane perpendicular to the axis of the cable.

In keeping with another arrangement shown within FIGS. 6 and 7, the components constituting vises can be mounted upon the clamps so as to operate within a plane which is parallel to the axis of the cable. In this instance, the components identified by reference number (29') are mounted lengthwise upon a clamp (26), according to the direction of the axis of the hauling line (24).

A spring, such as the one identified by reference number (27), is provided in order to permit releasing of the cable from the vise. This spring, which may or may not be remotely controlled, functions so as to separate the cable and the hauling line when the vise is opened. The structure of the spring can be similar to that of one of the components identified as (29'), and it can therefore be operated by remote control at the same time as opening of the latter component (a bimetal strip, et cetera . . . ).

The spring can also be of the passive type, whereby its functioning would produce no results so long as the vise is engaged.

It is also possible to provide a mechanical attachment for preventing releasing of the cable while the cable is being placed within the vise.

As as been indicated previously, it is possible for a fluid to be injected into the conduit at a high speed, in order to facilitate feeding of the cable and in order to reduce friction with the inner surface of the conduit. Reference number (17) within FIG. 1 indicates the corresponding components.

It is obvious that any modifications which may be introduced with respect to the previously described example would not constitute departures from the context of the present invention.

I claim:

1. Apparatus for installing a cable within a conduit by means of a hauling line, comprising a plurality of vises attached to and spaced along the hauling line, each vise having a mechanism that can be actuated to open or close the vise in order to release or grip the cable, respectively, and remote control means for actuating said mechanism independently of the tension in the hauling line to open the vises after the cable has been drawn into the conduit by the hauling line and the vises, so that the hauling line and the vises attached thereto may be withdrawn from the conduit while the cable remains in the conduit.

2. Apparatus in accordance with claim 1, wherein each vise comprises a clamp attaching the same to the hauling line and each mechanism comprises a pair of components for gripping the cable therebetween, at least one of the components being supported on the clamp for pivotal movement relative to the other about an axis substantially parallel to the hauling line, said vises having means for releasably holding the movable components thereof in positions at which the vises are closed.

3. Apparatus in accordance with claim 2, wherein said holding means comprises a plate attached to each clamp and a stop attached to each movable component.

4. Apparatus in accordance with claim 1, wherein said mechanism comprises a magnet and said remote control means comprises means for remotely varying a magnetic field associated with the magnet.

5. Apparatus in accordance with claim 4, wherein said magnetic field varies in relation to the Curie point and wherein said means for varying the magnetic field comprises means for changing the temperature of said magnet.

6. Apparatus in accordance with claim 1, wherein said mechanism comprises components arranged to move relatively in a plane substantially perpendicular to the axis of the hauling line.

7. Apparatus in accordance with claim 1, wherein said mechanism comprises components arranged to move relatively in a plane substantially parallel to the axis of the hauling line.

8. Apparatus in accordance with claim 1, wherein said mechanism includes spring means for biasing the mechanism to a particular position.

9. Apparatus in accordance with claim 1, wherein said mechanism includes thermally responsive means for opening the vise and wherein said remote control means comprises means for remotely changing the temperature of the thermally responsive means.

10. A method of installing a cable within a conduit by means of a hauling line, that comprises attaching a plurality of vises to the hauling line at locations spaced along the length of the hauling line, closing the vises upon the cable, drawing the cable into the conduit by pulling on the hauling line, and opening the vises by remote control independently of tension in the hauling line so that the hauling line and the vises may be pulled from the conduit while the cable remains in the conduit.

11. A method in accordance with claim 10, wherein the vises are controlled magnetically.

12. A method in accordance with claim 10, wherein the vises are controlled thermally.

13. A method in accordance with claim 10, wherein each of the vises is provided with bimetallic cable gripping means and wherein the temperature of the bimetallic cable gripping means is varied remotely to release the cable from the gripping means.

14. A method in accordance with claim 10, wherein each of the vises is provided with magnetically actuated gripping means having a magnetic field that is varied thermally to release the cable from the gripping means, and wherein the temperature of the magnetically actuated gripping means is varied remotely to release the cable.

* * * * *